United States Patent
Pflug et al.

(10) Patent No.: US 10,449,929 B2
(45) Date of Patent: Oct. 22, 2019

(54) SYSTEM FOR THE AUTOMATIC CONTROL OF THE ACCESS AND/OR ENGINE START AUTHORIZATION OF A USER IN A VEHICLE

(71) Applicant: VOLKSWAGEN AG, Wolfsburg (DE)

(72) Inventors: Florian Pflug, Braunschweig (DE); Hendrik Decke, Braunschweig (DE)

(73) Assignee: Volkswagen AG (DE)

( * ) Notice: Subject to any disclaimer, the term of this patent is extended or adjusted under 35 U.S.C. 154(b) by 69 days.

(21) Appl. No.: 15/687,021

(22) Filed: Aug. 25, 2017

(65) Prior Publication Data
US 2018/0056937 A1 Mar. 1, 2018

(30) Foreign Application Priority Data

Aug. 25, 2016 (DE) .................. 10 2016 216 053

(51) Int. Cl.
  *B60R 25/20* (2013.01)
  *B60R 25/04* (2013.01)
  *B60R 25/24* (2013.01)
  *B60R 25/33* (2013.01)

(52) U.S. Cl.
  CPC .......... *B60R 25/2036* (2013.01); *B60R 25/04* (2013.01); *B60R 25/24* (2013.01); *B60R 25/33* (2013.01); *B60R 2325/101* (2013.01); *B60R 2325/106* (2013.01); *B60R 2325/205* (2013.01)

(58) Field of Classification Search
  CPC ..... B60R 25/04; B60R 25/24; B60R 25/2036; B60R 25/33; B60R 2325/101; B60R 2325/106; B60R 2325/205

USPC ............................................................ 701/2
See application file for complete search history.

(56) References Cited

U.S. PATENT DOCUMENTS

| | | | | |
|---|---|---|---|---|
| 7,511,833 | B2 * | 3/2009 | Breed | G01F 23/0076 180/272 |
| 2001/0056544 | A1 * | 12/2001 | Walker | B60R 25/02 726/2 |
| 2002/0097145 | A1 * | 7/2002 | Tumey | B60R 25/04 340/426.28 |

(Continued)

FOREIGN PATENT DOCUMENTS

| | | |
|---|---|---|
| DE | 19735658 C1 | 7/1998 |
| DE | 102004001904 A1 | 8/2005 |

(Continued)

*Primary Examiner* — Atul Trivedi
(74) *Attorney, Agent, or Firm* — Barnes & Thornburg LLP (57) ABSTRACT

A system for automatic control of entry and/or motor starting authorization of a user for a vehicle. A control device or a computation device associated with the control device uses at least one statistical computation method to compute a probability of misuse for obtaining an entry and/or motor starting authorization for the vehicle. If the computed probability of misuse reaches or exceeds a prescribable threshold value, a control signal at least for unlocking the vehicle doors and/or for enabling of the motor control device is/are stopped or produced by the control device only if at least one additional authentication criterion has been satisfied; and/or the system for control of entry and/or motor starting authorization is deactivated if it is established that the vehicle is parking in an environment where the probability of future misuse of the electronic key reaches or exceeds a prescribable threshold value.

20 Claims, 2 Drawing Sheets

(56) References Cited

U.S. PATENT DOCUMENTS

| | | | | |
|---|---|---|---|---|
| 2003/0209893 | A1* | 11/2003 | Breed | B60J 10/00 280/735 |
| 2005/0226201 | A1* | 10/2005 | McMillin | H04L 45/00 370/348 |
| 2006/0251293 | A1* | 11/2006 | Piirainen | B60N 2/002 382/104 |
| 2008/0027591 | A1* | 1/2008 | Lenser | G05D 1/0251 701/2 |
| 2008/0174431 | A1* | 7/2008 | Rodgers | B60R 25/102 340/572.1 |
| 2008/0292146 | A1* | 11/2008 | Breed | B60N 2/002 382/118 |
| 2010/0217630 | A1* | 8/2010 | Ehrman | G06Q 10/02 705/5 |
| 2010/0305779 | A1* | 12/2010 | Hassan | G01C 17/38 701/2 |
| 2012/0018989 | A1* | 1/2012 | Breed | B60R 21/01516 280/735 |
| 2012/0143401 | A1* | 6/2012 | Jayadevappa | B62H 3/00 701/2 |
| 2013/0033381 | A1* | 2/2013 | Breed | B60T 1/005 340/568.1 |
| 2015/0312404 | A1* | 10/2015 | Abramson | H04W 4/027 455/418 |
| 2017/0232930 | A1* | 8/2017 | Murar | B60R 25/24 340/5.61 |
| 2017/0305349 | A1* | 10/2017 | Naboulsi | B60R 1/04 |

FOREIGN PATENT DOCUMENTS

| | | |
|---|---|---|
| DE | 102005042079 A1 | 3/2006 |
| DE | 102006047390 A1 | 4/2007 |
| DE | 112007000932 T5 | 8/2009 |
| DE | 112013006560 B4 | 9/2016 |

\* cited by examiner

SYSTEM FOR THE AUTOMATIC CONTROL OF THE ACCESS AND/OR ENGINE START AUTHORIZATION OF A USER IN A VEHICLE

PRIORITY CLAIM

This patent application claims priority to German Patent Application No. 10 2016 216 053.2, filed 25 Aug. 2016, the disclosure of which is incorporated herein by reference in its entirety.

SUMMARY

Illustrative embodiments relate to a system for automatic control of the entry and/or motor starting authorization of a user for a vehicle. Illustrative embodiments also provide a method for controlling the system and a vehicle having the system.

BRIEF DESCRIPTION OF THE DRAWINGS

The disclosed embodiments are explained in more detail with reference to the attached drawings, in which.

DETAILED DESCRIPTION

Modern vehicles, particularly motor vehicles, are increasingly being fitted with automatic locking and starting systems in which the vehicle key (radio key, electronic key) no longer needs to be actively operated by the user to open or lock the vehicle doors and to start the motor. Systems of this kind are known by various names, such as KESSY®, KEYLESS GO®, Advanced Key, Keyless Access, Comfort Access, Keycard Handsfree, KeyFree Power, Keyless Start, Smart Entry & Start, etc.

All these systems and the methods performable thereby are based on the presence of an electronic key associated with the vehicle being detected in direct proximity to the vehicle.

To this end, a vehicle-based control device uses a transmitter/receiver to transmit, for example, on operation of a door handle of a vehicle door or at prescribed intervals of time, inter alia an electromagnetic signal, referred to as a wake signal, for the associated electronic key, the range of the signal being only a few meters (often only approximately one meter) around the antennas regularly fitted at proximity to the doors. Subsequently, an associated electronic key within range of the radio signal uses the transmitter/receiver provided for it to transmit inter alia an encoded signal for authentication thereof. If the outcome of the authentication is positive, the vehicle-based control device lifts at least the lock on the vehicle doors.

Furthermore, there may be provision for further control signals to be produced by the vehicle-based control device, for example, for enabling and/or disabling of the motor control device, of an engine immobilizer, for the unlocking and/or locking of the ignition lock, of the steering wheel lock, etc. This regularly requires the presence of the electronic key to be detected in the interior of the vehicle.

When the user of the vehicle locks the car doors from the outside or takes the electronic key outside the extent of the range of the radio signals transmitted by the vehicle-based control device, at least automatic locking of the vehicle doors again is regularly effected. Furthermore, it is self-evidently also possible for the further vehicle-based devices mentioned above to be locked or disabled again and for vehicle windows and sliding roofs, for example, to be automatically closed.

Various extensions are known for the automatic locking and starting system outlined above to increase security against misuse.

For example, DE 197 35 658 C1 thus prevents misuse of transponders (electronic keys) included in a vehicle by proposing a method in which a lock command prompts a controller in a vehicle to deliver a check signal that is used to establish whether there are still transponders in the vehicle interior after locking. Transponders that are identified as being in the vehicle interior after locking are recorded in a memory associated with the controller. During subsequent, correct vehicle entry, transponders that are not recognized in the interior are disabled.

In the case of automatic locking and starting systems of the type mentioned above, the radio link between vehicle and electronic key, which radio link is actually designed for short distances, can be extended up to several hundred meters by a radio relay (this often also being referred to as a "relay attack"), so that the vehicle can be opened improperly, and sometimes even started and stolen, without the direct presence of the authorized person or, in more accurate terms, the authorized electronic key.

To prevent such improper opening and possibly stealing of a vehicle by a relay attack, DE 10 2004 001 904 A1 proposes a locking system with a keyless entry/keyless go functionality that has a vehicle-based control device, for example, for unlocking and/or locking of the car doors, of the ignition lock, for enabling and/or disabling of the motor control device, and an electronic key (radio key) associated by the control device. To identify misuse by an unauthorized person, the electronic key, on receiving and/or sending at least one signal, produces perceptible feedback for the user in the style of an alarm signal.

Further known measures against a relay attack are verification of the local proximity of the electronic key to the associated vehicle by propagation time measurement and/or a check on at least one second feature. Such a second feature may be a fingerprint, for example, which is captured by a fingerprint scanner on the door handle of the vehicle or on the electronic key, for example, or detection of the presence of a trustworthy mobile device, for example, via BLUETOOTH® or WLAN.

Since the signal propagation time varies in the nanosecond range on account of the short distances under consideration here and the propagation of the radio signals at almost the speed of light, a propagation time measurement needs to be very exact and the response time (computation time) of the electronic key must not fluctuate to a substantially greater degree than the signal propagation time to be measured. Otherwise, it is not possible to obtain reliable statements about the presence of the electronic key. These circumstances require highly accurate and hence cost-intensive hardware. Moreover, with regard to the electronic keys, it is also necessary to take into consideration the limited resources available in that case, such as a desirable, longest possible battery life (i.e., a lowest possible power requirement) for simultaneously small dimensions of the electronic key.

Moreover, the check on a second feature requires additional cost-intensive hardware (for example, fingerprint scanner, WLAN hotspot), needs to be actively taught by the user (for example, capture of fingerprint) or necessitates further preparatory measures (for example, mobile device preparation). In the case of identification of a trustworthy mobile device, it is furthermore always necessary for the "trained devices" to be carried in operative mode by the user.

Also to avoid or prevent theft of a vehicle, DE 11 2007 000 932 T5 discloses a control apparatus for a vehicle door lock, which control apparatus is mounted in a vehicle to lock and unlock the closed doors in accordance with an operation by a user, having: an automatic door locking unit that locks the doors if no opening operation for the vehicle door is sensed within a prescribed timeout period after the doors are unlocked by the user: and a timeout time determination unit that determines the prescribed timeout period based on position information for its own vehicle.

DE 10 2005 042 079 A1 also describes an antitheft system for a vehicle. This system involves a plan acquisition mechanism receiving a plan of use for the vehicle, the plan of use for the vehicle including a future time for the next vehicle use. Further, the antitheft system comprises an interval computational mechanism for computing an interval between the current time and the future time and also a security level setting mechanism for setting a security level of the antitheft system on the basis of the interval between the current time and the future time.

Moreover, DE 10 2006 047 390 A1 relates to a theft prevention system for a vehicle in which a tilt sensor, height sensors and tire pressure sensors sense a behavior of a parked vehicle and output an angle signal, a height signal and a pressure signal. These sensor signals are received by a sensor signal receiving section. An initial value setting section sets an initial sensor signal for the tilt sensor, the height sensors and the tire pressure sensors as an initial value for the relevant sensor. A comparison section then compares each initial value with a currently occurring sensor signal. Based on the result of the comparison, a determination section determines whether the vehicle is stolen or is being stolen.

Moreover, to eliminate an unnecessary power consumption by an electronic key terminal, DE 11 2013 006 560 T5 proposes providing the electronic key terminal with a position information obtaining section that obtains lock position information for the lock position of a vehicle and terminal position information for the position of the electronic key terminal. A power consumption elimination section provided for the electronic key terminal reduces the power consumption if the distance between the lock position of the vehicle, as indicated by the lock position information, and the position of the electronic key terminal, as indicated by the terminal position information, is greater than or equal to a stipulated distance.

According to the disclosed embodiments, a system for automatic control of the entry and/or motor starting authorization of a user for a vehicle, particularly for a motor vehicle, is proposed, wherein the system has a control device that can control at least one of the functions of unlocking/locking vehicle doors and/or enabling/disabling of the motor control device. The system further has an electronic key associated with the control device, wherein the control device and the electronic key can send and receive signals, and wherein at least one signal transmitted from the electronic key to the control device is an encoded signal for authentication of the electronic key, so that after evaluation of the encoded signal, given an authorized electronic key, the control device can produce a control signal/control signals at least for unlocking vehicle doors and/or for enabling of the motor control device.

The disclosed system is characterized in that the control device or a digital computation device associated therewith is set up to compute, after receiving the encoded signal for an authorized electronic key, by at least one statistical computation method, using a piece of information or pieces of information that is or are present in the control device or in a memory device associated with the digital computing device or with the control device and that is or are able to be used as an indicator or indicators for computation of a probability of misuse of the electronic key, a probability of misuse for the current process of obtaining an entry and/or motor starting authorization for the vehicle, and if the computed probability of misuse reaches or exceeds a prescribable threshold value, a control signal/control signals at least for unlocking the vehicle doors and/or for enabling of the motor control device is/are stopped or is/are produced by the control device only if at least one additional authentication criterion has been or is satisfied; and/or the control device is set up to take current parking coordinates of the vehicle as a basis for deactivating the system for control of the entry and/or motor starting authorization if, on the basis of the current parking coordinates and of at least one further criterion associated or associable with the parking position, at least one statistical computation method performed by the control device or a computation device associated therewith is used to establish that the vehicle is parking in an environment in which the probability of future misuse of the electronic key reaches or exceeds a prescribable threshold value.

According to a first disclosed embodiment, the disclosed system uses statistical identification to identify deviant behavior, such as improper, unauthorized unlocking and/or motor start of the vehicle using an automatic "keyless" locking system (for example, KESSY®). At least one, for instance, multiple (piece/s of information) and datum/data present in the vehicle is/are used to compute a probability of misuse by at least one statistical computational method. If the computed probability value is above a, possibly dynamic threshold value (and if either the reliability of the computation or the statistical reliability is sufficiently high), unlocking of the vehicle doors and/or enabling of the motor control device is stopped or unlocking of the vehicle doors and/or the enabling of the motor control device require/s at least one additional authentication criterion to have been or to be satisfied.

The proportion of misuses of an electronic key is very small in comparison with the proportion of proper uses. In all cases of (identified) proper use, a user is readily granted entry to the vehicle by the disclosed system and it may even be possible for the motor to be started, without this requiring any additional cost-intensive hardware. Merely in the few cases of misuse of an electronic key, which are identified with a high level of reliability on account of the computation method used, there may be provision for an additional authentication criterion to have to be satisfied or on hand, this being able to be realized with comparatively little computation and at little cost in most cases, however.

According to a second disclosed embodiment of the present disclosure, misuse of an electronic key for an automatic locking and starting system for a vehicle is preventable prophylactically in a simple and low-cost manner.

In the disclosed system the indicator or indicators that can be used for computation of a probability of current misuse of the electronic key for an entry authorization and/or a motor starting authorization is at least one piece of information that is selectable from the group consisting of:

- time of the last stoppage and/or times of the last stoppages of the motor of the vehicle;
- time of the last start and/or times of the last starts of the motor of the vehicle;
- time of the last locking and/or times of the last locks of the vehicle doors;
- time of the last unlocking and/or times of the last unlocks of the vehicle doors;
- time of the last disabling and/or times of the last disablings of the motor control device;
- time of the last enabling and/or times of the last enablings of the motor control device;
- the vehicle door that was used the last time and/or the last times for unlocking the vehicle doors;
- the time difference between the last unlocking and the last locking of the vehicle doors and/or the time differences between the last unlocks and the last locks of the vehicle doors;
- the time difference between the last stoppage of the motor of the vehicle and the last locking of the vehicle doors and/or the time differences between the last stoppages of the motor of the vehicle and the last locks of the vehicle doors;
- the time difference between the last unlocking of the vehicle doors and the last start of the motor of the vehicle and/or the time differences between the last unlocks of the vehicle doors and the last starts of the motor of the vehicle;
- the vehicle door/vehicle doors that was/were opened the last time and/or the last times to get in;
- approximate position of the electronic key in the interior of the vehicle before the last start of the motor of the vehicle or the approximate positions of the electronic key in the interior of the vehicle before the last starts of the motor of the vehicle;
- times of regularly made journeys;
- regular times of nonuse of the vehicle;
- parking coordinates of the vehicle;
- further criterion associated or associable with the parking position.

According to a second development of the system, the additional authentication criterion that can be used is at least one that is selectable from the group consisting of:

- manual operation of the electronic key;
- presence of a trustworthy mobile device within a maximum, prescribable distance from the vehicle;
- presence of a mobile device on hand for the last locking of the vehicle doors (5) within a maximum, prescribable distance from the vehicle (3);
- confirmation action by a user for a trustworthy mobile device;
- authentication by voice recognition;
- authentication by performance of a prescribable gesture.

In the disclosed system, the further criterion associated or associable with the parking position that can be used is at least one that is selectable from the group consisting of:

- public carpark;
- railroad station or surroundings of a railroad station;
- surroundings of a freeway entry ramp;
- rest area on a freeway;
- environment with an increased number of criminal offences in comparison with the average;
- private carpark;
- residence;
- workplace.

The disclosed system can further have a signaling device or the system may have an associated signaling device that can be used to signal to the user the denial of unlocking of the vehicle doors, the denial of enabling of the motor control device, the requirement for an additional authentication criterion and/or deactivation of the system for control of the entry and/or motor starting authorization.

The computation of the probability of misuse for the current process of obtaining an entry and/or motor starting authorization for the vehicle, and/or the computation of the probability of future misuse of the electronic key, can be effected using at least one statistical computation method that makes use of or is based on:

- a neural network;
- a rule-based method;
- a tree-based algorithm;
- a genetic algorithm;
- fuzzy logic;
- a hybrid model;
- a Bayesian network;
- meta learning.

Furthermore, the disclosed system may be developed to the effect that it has a learning mode that, when activated, allows data regarding proper use of the vehicle to be captured and/or input into the system by a legitimate user of the vehicle.

The present disclosure also comprises a vehicle, particularly a motor vehicle, having a system according to the disclosure or one of the developments and configurations of the system.

The present disclosure further also comprises a method for control of a system for the automatic entry and/or motor starting authorization of a user for a vehicle, wherein the system has a control device that can control at least one of the functions of unlocking/locking vehicle doors and/or enabling/disabling of the motor control device, and an electronic key associated with the control device, wherein the control device and the electronic key have a mechanism for sending and receiving signals, and wherein at least one signal transmitted from the electronic key to the control device is a coded signal for authentication of the electronic key, so that after evaluation of the coded signal, for an authorized electronic key, the control device can produce/produces a control signal/control signals at least for unlocking vehicle doors and/or for enabling of the motor control device.

The method is characterized in that
the control device or a digital computation device associated therewith computes, after receiving the encoded signal for an authorized electronic key, by at least one statistical computation method, using a piece of information or pieces of information that is or are present in the control device or in a memory device associated with the digital computing device or with the control device and that is or are able to be used as an indicator or indicators of misuse of the electronic key, a probability of misuse for the current process of obtaining an entry and/or motor starting authorization for the vehicle, and if the computed probability of misuse reaches or exceeds a prescribable threshold value, a control signal/control signals at least for unlocking the vehicle doors and/or for enabling of the motor control device is/are stopped or is/are produced by the control device only if at least one additional authentication criterion has been or is satisfied; and/or the control device takes current parking coordinates of the vehicle as a basis for deactivating the system for control of the entry and/or motor starting authorization if, on the basis of the current parking coordinates and of at least one further criterion associated or associable with the parking position, at least one statistical computation method performed by the control device or a computation device associated therewith is used to establish that the vehicle is parking in an environment in which the probability of future misuse of the electronic key reaches or exceeds a prescribable threshold value.

The method may be preceded by a preliminary method in which a neural network is trained using a training data record and subsequently verified on the test data.

The present disclosure also comprises further methods that readily emerge for a person skilled in the art from the apparatus claims, the entire descriptive part and the figures.

The depictions in the figures are purely schematic and are not to scale. In the figures, like or similar elements are provided with like reference symbols.

The exemplary embodiments are explained below, and the present disclosure is naturally not restricted to these embodiments.

The features and combinations of features cited in the description above and the features and combinations of features cited in the description of embodiments, exemplary embodiments and the description of the figures below and/or shown in the figures alone can be used not only in the respectively indicated combinations but also in other combinations or on their own without departing from the scope of the present disclosure.

The system 1 is based on automatic locking and starting systems of the type in question for a vehicle 3 that are known from the prior art and that can be used to realize a keyless entry/keyless go functionality. Against this background, the system 1 for controlling the entry and/or motor starting authorization of a user 2 for a vehicle 3 comprises—in a manner known per se—a control device 4 that can control at least one of the functions of unlocking/locking vehicle doors 5 and/or enabling/disabling of the motor control device 6, and an electronic key 7 associated with the control device 4—as depicted schematically and by way of example in FIG. 1. The control device 4 and the electronic key 7 have a mechanism for sending and receiving 8, 8' signals. At least one signal transmitted from the electronic key 7 to the control device 4 is an encoded signal for authentication of the electronic key 7, so that after evaluation of the encoded signal, given an authorized electronic key 7, the control device 4 can produce a control signal/control signals at least for unlocking vehicle doors 5 and/or for enabling of the motor control device 6.

The system 1 is distinguished from automatic locking and starting systems of the type in question for vehicles in that, according to at least one disclosed embodiment of the system 1, the control device 4 or a digital computation device (not depicted explicitly in FIG. 1 for the sake of clarity) associated therewith is set up to compute, after receiving the encoded signal for an authorized electronic key 7, by at least one statistical computation method, using a piece of information or pieces of information that is or are present in the control device 4 or in a memory device (likewise not depicted explicitly in FIG. 1 for the sake of clarity) associated with the digital computation device or with the control device 4 and that is or are able to be used as an indicator or indicators of misuse of the electronic key 7, a probability of misuse for the current process of obtaining an entry and/or motor starting authorization for the vehicle 3, and if the computed probability of misuse reaches or exceeds a prescribable threshold value, a control signal/control signals at least for unlocking the vehicle doors 5 and/or for enabling of the motor control device 6 is/are stopped or is/are produced by the control device 4 only if at least one additional authentication criterion has been or is satisfied.

Figure 1:
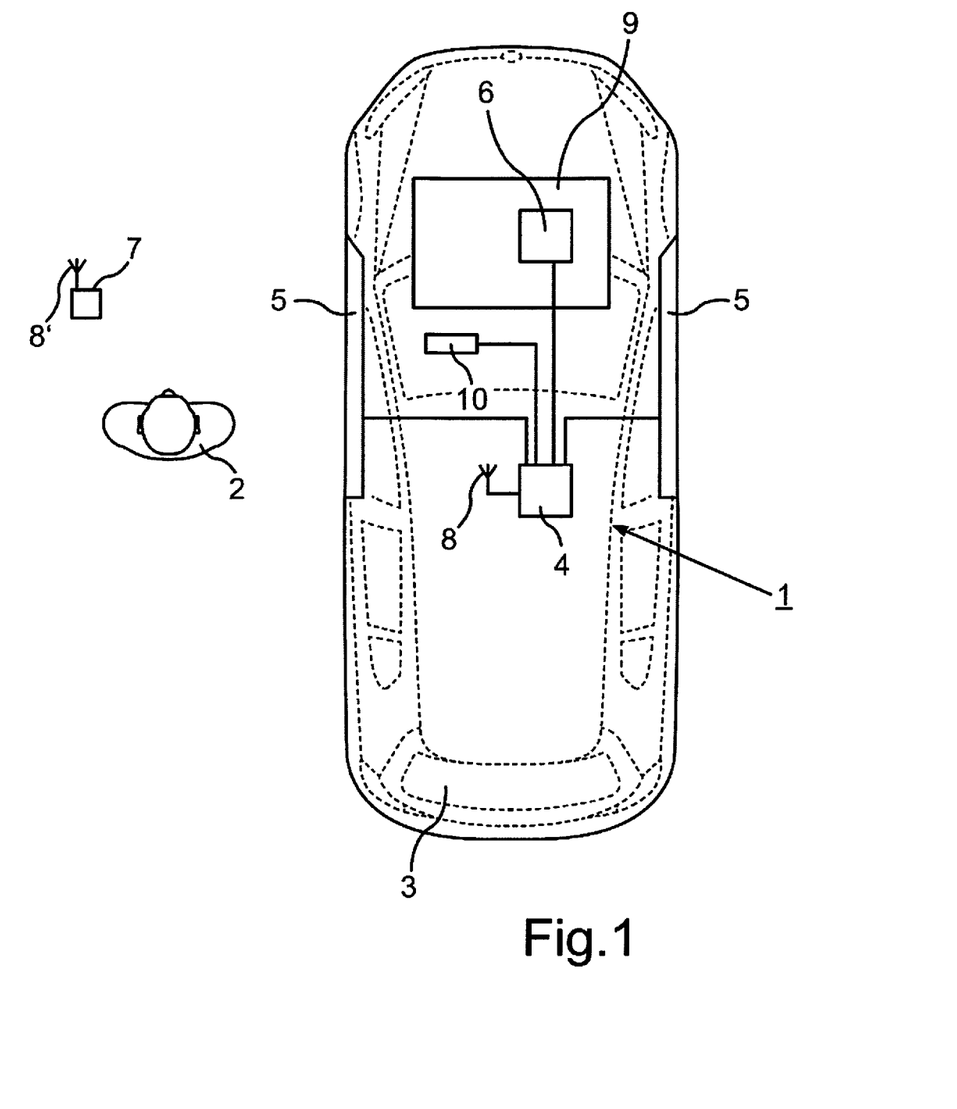
FIG. 1 shows a schematic view of an example of the disclosed system.

The control device 4 of the system 1 may naturally also be set up to produce further control signals, for example, control signals for enabling/disabling of the ignition lock, of the steering wheel lock, of the engine immobilizer, etc., i.e., the control device 4 may be set up to produce all control signals known even for automatic locking and starting systems of the type in question for vehicles. Furthermore, there may be provision for production of this/these further control signal/control signals likewise to be stopped or to be effected only if at least one additional authentication criterion has been or is satisfied when a threshold value for the probability of misuse is reached or exceeded.

The electronic key 7 may fundamentally likewise be an—inherently known—radio key, for example, a chip card or the like.

There may be provision for the sensitivity of the system 1 (and also of the method) to be able to have been or to be able to be designed or set differently. To this end, it is possible for the threshold values to be set or prescribed to be higher (=less sensitive system 1) or lower (=more sensitive system 1), for example.

The piece of information or pieces of information that can be used as an indicator or as indicators for misuse of the electronic key 7 is/are not especially restricted and it is possible for further information, including further information not explicitly cited in the present application to be used for the present disclosure.

In a simple case, the information (data) that is/are present in the vehicle anyway for automatic locking and starting systems for vehicles according to the prior art can be used. Such information (data) that is present anyway comprise/s, for example, time of the last motor stoppage; time of the last motor start; time of the last locking of the vehicle doors 5; time of the last unlocking of the vehicle doors 5; vehicle door 5 that was used for the last unlocking; vehicle door 5 or vehicle doors 5 that was/were opened for getting in approximate key position in the interior of the vehicle 3 before the last motor start (front left, front right, rear).

In an extended disclosed embodiment, the system 1 may also provide, in the control device 4 or in a memory device associated with the digital computation device or with the control device 4, the times of the last motor stoppages; times of the last motor starts; times of the last locks of the vehicle doors 5; times of the last unlocks of the vehicle doors 5; vehicle door 5 that was used the last few times for unlocking; vehicle door 5 or vehicle doors 5 that was/were opened the last few times for getting in; and/or approximate key positions in the interior of the vehicle 3 before the last motor starts (front left, front right, rear) and also further information, for example: time of the last disabling and/or times of the last disablings of the motor control device 6; and/or time of the last enabling and/or times of the last enablings of the motor control device 6.

Insofar as the terms "last few times", "last" or the like are used in this context, these comprise at least the last two times. How many processes are meant to be understood by "last few times" or "last" may be stored in a suitable manner in the system 1 (for example, a numerical statement or a period). It will be necessary to take into consideration here what number of processes is required for computing a statistically relevant statement. In this regard, there may also be provision for an FIFO method.

From this (these) information (data)—not intended to be understood as conclusive—above, it is possible, according to the disclosure, for further information—likewise not intended to be understood as conclusive—to be derived, such as, for example: the time difference between the last unlocking and the last locking of the vehicle doors 5 and/or the time differences between the last unlocks and the last locks of the vehicle doors 5; the time difference between the last stoppage of the motor 9 of the vehicle 3 and the last locking of the vehicle doors 5 and/or the time differences between the last stoppages of the motor 9 of the vehicle 3 and the last locks of the vehicle doors 5; the time difference between the last unlocking of the vehicle doors 5 and the last start of the motor 9 of the vehicle 3 and/or the time differences between the last unlocks of the vehicle doors 5 and the last starts of the motor 9 of the vehicle 3; times of regularly made journeys; and/or regular times of nonuse of the vehicle 3.

From the immediately available information and from the information derived therefrom, it is possible to derive sets of rules, for example. Such sets of rules—not intended to be understood as conclusive—can comprise, for example: journeys from the residence to the workplace: these can be identified using time heuristics, for example, since they regularly take place only on work days and are made within a definable period (for example, between 07:00 hours and 07:30 hours); after termination of the journey to the workplace and locking of the vehicle doors 5, the vehicle doors 5 are regularly unlocked only after a time difference of approximately 8 hours; journeys from the workplace to the residence: these can likewise be identified using time heuristics, since they regularly take place on work days and are made within a definable period (for example, between 17:00 hours and 18:00 hours); after termination of the journey to the residence and locking of the vehicle doors 5, the vehicle doors 5 are regularly unlocked only after a period in the region of 10 to 12 hours; shopping trips: these can likewise be identified using time heuristics, since they often take place on Saturdays and are made within a definable period (for example, between 08:00 hours and 12:00 hours); after locking of the vehicle doors 5, the vehicle doors 5 are normally unlocked again only after a period of between 15 min and 3 hours, for example; regular order of door openings for the vehicle 3 before journeys to and from the workplace, for example, with regular opening of a trunk lid 5 or a tailgate 5 (for example, to stow a briefcase, a (tool) case, clothing, etc.) before the driver's door 5 is opened; regular stowage location for the electronic key 7 before journeys to and from the workplace (for example, at the front right on the passenger's seat).

If the system 1 is set up to be able to receive data from a position determination device for the vehicle 3 (which position determination device is already on hand in many modern vehicles on account of the satellite-based navigation devices on hand therein), then the parking coordinates can also be taken into consideration for the computation of a probability of misuse.

Besides the parking coordinates, it is also possible for at least one criterion associated or associable with the parking position to be made available to the system 1, for example, by a satellite-based navigation device (not depicted explicitly in the figures) associated with the vehicle 3 (GNSS; for example, using the GPS satellite system or the GLONASS satellite system).

A satellite-based navigation device associated with the vehicle 3 may be a navigation device installed at the vehicle end, for example, but also a mobile navigation device or a mobile device (for example, a smartphone) on which an applicable program (App) and associated map data are installed in executable form. In all cases, a suitable (wireless or wired) communication option needs to be provided between the system 1 and the navigation device (for example, a short-range radio link, for example, based on a BLUETOOTH® standard, a WLAN standard, NFC, etc., and/or a wired link based on an established standard, such as USB, CAN, etc.).

Satellite-based navigation devices have not only a device for position determination but also digital road data. On the basis of the parking coordinates of the vehicle 3, the digital road data, which often also include what are known as "points of interest", can be used to establish whether the vehicle 3 is parking in a public carpark, at the railroad station or in the surroundings of a railroad station, in the surroundings of a freeway entry ramp, in a rest area on a freeway, in a private carpark, at the residence or at the workplace, for example. In this case, the criterion "surroundings" may be defined in any suitable manner, for example, a physical, maximum distance from a prescribed location (for example, railroad station building, freeway entry ramp, etc.).

Moreover, a piece of information indicating whether the vehicle 3 is parking in an environment with an increased number of criminal offences in comparison with the average (particularly in an environment with an increased number of relay attacks in comparison with the average) can be obtained by a telecommunication link (for example, by a mobile radio link) from the vehicle 3 to an applicable information source (for example, available via the Internet), for example, stored in the system 1 (in the control device 4 or a memory device associated therewith) and if need be updated.

Based on the parking coordinates and the at least one (further) criterion associated or associable with the parking position, it is then possible, if need be taking into consideration further information (such as time of day, day of the week, etc.), to make an assessment as to whether the vehicle 3 is parking in an "unsafe" area and, if so, possibly also in what degree of unsafe area, and to compute a probability of a future "relay attack" having to be expected in the given "unsafe" area. If the computed probability reaches or exceeds a prescribable (possibly even dynamically alterable) threshold value, then the control device 4 deactivates the system 1 for security reasons and signals this to the user 2.

In the event of such deactivation of the system 1, a user 2 gains entry to the vehicle 3 (unlocking of the vehicle doors 5) again, for example, by operating a button on the electronic key 7. The deactivation of the system 1 is temporary, i.e., it is canceled again as soon as the vehicle 3 leaves (has left) the "unsafe" area again.

Depending on the depth of learning of the system 1, the current parking position of the vehicle 3 can be taken as a basis for identifying, for example, whether the vehicle 3 is parking at (or in the surroundings of) the workplace, at (or in the surroundings of) the residence or, by way of example, at a shopping center or, in more general terms, in a "shopping area".

It is likewise possible for—if need be taking into consideration the day of the week and the time of day—the current parking position to be taken as a basis for inferring that the vehicle 3 has been used to make a journey to a bakery or a supermarket. In such a case, for the computation of a probability of misuse, the system 1 can take into consideration that shopping at a baker's or in a supermarket often takes only comparatively little time, which means that locking of the vehicle doors 5 and fresh unlocking of the vehicle doors 5 take place within an only comparatively short period (for example, in the region of a period of between only 5 and 10 minutes), without there being an improper entry and/or starting attempt.

If the system 1 uses at least one statistical computation method to compute, on the basis of the available information, a probability of misuse for the current process of obtaining an entry and/or motor starting authorization for the vehicle 3, and if the computed probability of misuse reaches or exceeds a prescribable (possibly dynamically alterable) threshold value, then there is provision, in line with one option, for a control signal/control signals at least for unlocking the vehicle doors 5 and/or for enabling of the motor control device 6 to be produced by the control device 4 only if at least one additional authentication criterion has been or is satisfied.

This at least one, additional authentication criterion, which a user 2 needs to use to verify himself as a legitimate user 2, is not subject to any special restriction, and, by way of example, it is possible, for this purpose, to be able to use at least one that is selectable from the group consisting of: manual operation of the electronic key 7; presence of a trustworthy mobile device within a maximum, prescribable distance from the vehicle 3; presence of a mobile device on hand for the last locking of the vehicle doors 5 within a maximum, prescribable distance from the vehicle 3; confirmation action by a user 2 for a trustworthy mobile device; authentication by voice recognition; authentication by performance of a prescribable gesture.

Requisite manual operation of the electronic key 7, for example, the operation of a key button, requires physical possession of the electronic key 7 and therefore effectively precludes a relay attack.

The check for the presence of a trustworthy mobile device (for example, a mobile phone, smartphone, smart watch) in direct proximity to the vehicle 3 can be made on the basis of the short distance between the vehicle 3 and the mobile device, for example, by a BLUETOOTH® link (with pairing having been performed) or by an encrypted WLAN link (which requires knowledge of the WLAN key).

Similarly, it is conceivable for the distance between a trustworthy mobile device and the vehicle 3 to be established by comparing the parking position (the coordinates) of the vehicle 3 against the current position (the coordinates) of the trustworthy mobile device, the data for the current position of the trustworthy mobile device may be transmitted to the vehicle 3 by a suitable (nonmanipulable, encrypted) transmission path, and the control device 4 or a digital computation device associated with the control device 4 being able to ascertain the distance between the trustworthy mobile device and the vehicle 3, and it thus being possible to establish whether or not the trustworthy mobile device is within the maximum, prescribable distance from the vehicle 3. Both in the case of the vehicle 3 and in the case of the mobile device, it is possible for the current coordinates to be ascertained with sufficient accuracy by a global navigation satellite system (GNSS).

To establish whether the trustworthy mobile device is actually involved, further safety precautions can be taken, for example, the transmission of the IMEI number of the mobile device or of the MAC address of the mobile device by the mobile device and comparison of these data in the vehicle 3 against corresponding data stored therein. Similarly, it is conceivable for a (nonmanipulable) time stamp for the ascertainment of the current position of the trustworthy mobile device to be transmitted to the vehicle 3 as well.

A confirmation action by a user 2 for a trustworthy mobile device can comprise, by way of example, the input of a prescribed PIN (Personal Identification Number) or the "drawing" of a prescribed pattern by stroking at least one finger over a touch-sensitive screen. The PIN or the drawn pattern can be transmitted from the mobile device to the vehicle 3 and evaluated therein. In this case too, there may be provision for safety measures to ensure that the transmission is effected at the current time and actually by the trustworthy mobile device.

The check for the presence of a mobile device on hand for the last locking of the vehicle doors 5 within a maximum, prescribable distance from the vehicle 3 can be effected in a similar manner to the check for the presence of a trustworthy mobile device. As for the trustworthy mobile device too, however, it will also be regularly necessary in this case to set up the mobile device and the system 1 as appropriate before the first check, but with lower demands on the "trustworthiness" of the mobile device needing to be met, both during setup and during the process of checking.

Authentication by voice recognition and/or performance of a prescribable gesture can be effected either using a trustworthy mobile device or at/in the vehicle 3 itself, for example. In the case of a mobile device such as a mobile phone, there is at least one microphone device. When a user 2 speaks a—possibly prescribable—text in proximity to this microphone device, the sound waves produced by him and captured by the microphone device can be transmitted from the trustworthy mobile phone to the vehicle 3 and analyzed therein. The sound waves can be (buffer) stored on the trustworthy mobile device and/or the vehicle 3. If a sufficiently great match is obtained between a stored voice (voice characteristic) and the currently captured voice, then a further authentication criterion is satisfied and (provided that no further authentication criterion is required) the control device 4 can produce at least one control signal, for example, for unlocking of the vehicle doors 5.

In a similar manner, a requisite (finger, hand, arm, head, foot, leg or body) gesture can be performed by a user 2, and this gesture can be captured by a camera device of a trustworthy mobile device. Moreover, in a similar manner to voice recognition, the video data can be transmitted to the vehicle 3 and analyzed therein in this case too. It is also possible for the video data to be (buffer) stored on the trustworthy mobile device and/or the vehicle 3. Moreover, if the gesture performed corresponds to a stored gesture, then a further authentication criterion is satisfied in this case too and (provided that no further authentication criterion is required) the control device 4 can produce at least one control signal, for example, for unlocking of the vehicle doors 5.

Both the voice recognition and the gesture recognition can (assuming an appropriately equipped vehicle 3) also be effected directly at/in the vehicle 3. Many current vehicles 3 already have at least one camera device for capturing surroundings of the vehicle 3, the camera device being able to be arranged in the region of the windshield of a motor vehicle 3, for example, and/or a camera device for capturing the head of a driver in the interior of a vehicle 3. Such a camera device can be used to capture a requisite gesture by a user 2 at/in the vehicle 3, which gesture can be analyzed by the control device 4 or a digital computation device associated with the control device 4.

Moreover, provided that the vehicle 3 has at least one microphone device for capturing sounds, such a microphone device can also be used to record the voice of a user 2, and the captured sound waves can be analyzed as appropriate. If the user 2 is still outside the vehicle 3, then the microphone device may be one for capturing sounds in the surroundings of the vehicle 3. If the user 2 is in the interior of the vehicle 3, then a microphone device that is already provided in many modern vehicles for contactless use of a mobile telephone that is in the vehicle 3 can be used for voice recognition, for example.

According to the present disclosure, however, there may also be provision for the requisite devices for voice and/or gesture recognition (microphone device and/or camera device, requisite hardware and software for analysis of the captured sound waves and/or of the captured video data) also to be separate devices that are associated exclusively with the system 1.

If it is necessary for an additional authentication criterion to be present or satisfied so that the control device 4 can provide at least one control signal for unlocking the vehicle doors 5 and/or for enabling of the motor control device 6, then the check for the presence of such an additional authentication criterion (verification criterion) can be effected unnoticed by the user 2 if need be, for example, in the case of the positive check on whether there is a trustworthy mobile device in direct proximity to the vehicle 3.

If the check for the presence of an additional authentication criterion requires the collaboration of the user 2, however, then the system 1 further has a signaling device 10 or the system 1 has an associated signaling device 10 that can be used to signal to the user 2 the requirement of an additional authentication criterion.

Such a signaling device 10 is not subject to any special restriction and it is possible for any visual, audible and/or haptic signaling device 10 suitable for the purpose to be provided. As such, the electronic key 7 may, by way of example, have provision for a light-emitting mechanism (for example, an LED), a sound-generating source and/or a mechanism for producing a vibration in the electronic key 7, which is used to signal to a user 2 that he needs to operate a button on the electronic key 7 to demonstrate an additional authentication criterion, for example.

Alternatively or additionally, it is also possible for a mobile device to be used as a signaling device 10, for example, by virtue of the mobile device using a loudspeaker device provided therein to output an applicable instruction or signal tones to the user 2 and/or using a display device (display) provided therein to display an applicable instruction. These signaling operations can likewise be supported by a haptically perceptible signal (vibration).

Figure 2:
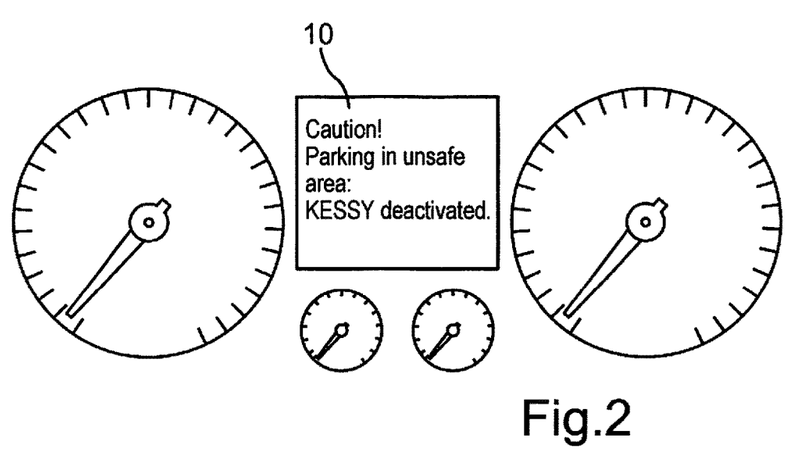
FIG. 2 shows a schematic view of an example of a signaling device that may be provided for the disclosed system.

A further example of a signaling device 10 is a display device (display, screen) in the interior of the vehicle 3, as depicted by way of example as part of a combined instrument in FIG. 2.

Further examples of a signaling device 10 that may be mentioned in nonconclusive ways at this juncture are a loudspeaker device at the vehicle 3 (for delivering sound to the interior of the vehicle 3 and/or to the surroundings of the vehicle 3), one or more light-emitting mechanisms on the vehicle 3, a device for producing a vibration, for example, in the steering wheel or (part of) the driver's seat, etc. The various signaling devices 10 listed here by way of example may be provided for the system 1 individually and in any desired combination of two or more thereof.

If the system 1 and the disclosed method are intended to achieve a highest possible level of security against misuse of an electronic key 7, ascertainment of an appropriately high probability of misuse can prompt unlocking of the vehicle doors 5 and/or starting of the motor to be stopped completely. This can be felt to be very annoying by a legitimate user 2 in the event of a misdetection, however.

As already mentioned above, the control device 4 in the system 1 may also be set up to take current parking coordinates of the vehicle 3 as a basis for temporarily deactivating the system 1 for control of the entry and/or motor starting authorization if and so long as at least one statistical computation method performed by the control device 4 or a computation device associated therewith is used to establish, on the basis of the current parking coordinates and at least one further criterion associated or associable with the parking position, that the vehicle 3 is parking in an environment in which the probability of future misuse of the electronic key 7 reaches or exceeds a prescribable threshold value.

Applicable visual signaling is depicted by way of example in FIG. 2.

The computation of the probability of misuse for the current process of obtaining an entry and/or motor starting authorization for the vehicle 3, and/or the computation of the probability of future misuse of the electronic key 7, is effected in the system 1 using at least one statistical computation method implemented in the system 1. Examples of such computation methods are those that make use of or are based on a neural network, a rule-based method, a tree-based algorithm, a genetic algorithm, fuzzy logic, a hybrid model, a Bayesian network and/or meta learning.

To perform the computation method/the computation methods, the control apparatus or the computation device associated therewith has a processor device that has at least one microprocessor and/or at least one microcontroller. Furthermore, the processor device can have program code for this setup to perform, when executed by the processor device, at least one disclosed embodiment, particularly of the disclosed method. The program code may be stored in a data memory of the processor device.

If multiple statistical computation methods are used, the results thereof (the probabilities of misuse obtained) can be combined with one another and if need be taken into consideration in differently weighted ways.

Some exemplary instances of application are set out below to provide for further comprehension of the disclosure.

A) For a morning journey to the workplace, the vehicle doors 5 are normally locked for a longer period (normally approximately 8 hours). If the system 1 knows or has "learned" that a user 2 occasionally returns again shortly after locking the vehicle doors 5, because he has forgotten something in the vehicle 3 (for example, his briefcase), then a corresponding process that would result in the vehicle doors 5 being unlocked is not assessed as a possible theft attempt and the control device 4 readily outputs a control signal for unlocking the vehicle doors 5.

However, if, shortly after the locking of the vehicle doors 5, not only are the vehicle doors 5 unlocked but also an attempt is made to start the motor 9 of the vehicle 3 (for example, by a start button provided for this purpose), then there is a sufficiently high probability of misuse in this case, since such behavior by the legitimate user 2 has not occurred before and it is necessary for additional authentication criterion to be present or satisfied for the motor control device 6 to be enabled and for the motor 9 to be able to be started, or the motor control device 6 is stopped from being enabled.

From this example, it is evident that the system 1 and the disclosed method can compute different probabilities of misuse or can apply different threshold values for the various control signals that can be produced by the control device 4. Consequently, the system 1 and the method can also exhibit different reactions for the various control signals.

The respective reactions of the system 1 can be ascertained for the various control signals right away as soon as an unlock request is detected (single-stage process), or, as soon as an unlock request is detected, the system 1 can first only ascertain the reaction for the unlock request, and only if the request is also detected after the motor 9 is started (for example, by virtue of a start button provided for this purpose being operated) can the system 1 ascertain the appropriate reaction therefor (two-stage process). The latter, two-stage process allows increased security to be achieved, since additional information can be taken into consideration therefor, which information is available only after at least one vehicle door 5 is opened (for example, stowage of the radio key in the interior of the vehicle 3, order of opening of the vehicle doors 5, interval time between a vehicle door 5 being opened and operation of the start button, etc.).

B) If unlocking and starting of the motor are performed only quite rarely for a vehicle 3 between 23:00 hours and 6:00 hours, then a corresponding attempt can regularly be assessed as misuse with such high probability that an additional authentication criterion is required for a control signal for unlocking of the vehicle doors 5 to be produced.

C) For a "relaxed" user type, the time difference between unlocking and starting the motor is large. If an usually short time difference is detected between unlocking and the attempt at starting the motor, this can be labeled as possible misuse. The opposite applies for a "dynamic" user type.

The present disclosure also comprises a vehicle 3, particularly a motor vehicle 3, and a method. Further developments of the method that are comprised by the present disclosure are ones that are readily evident to a person skilled in the art from the apparatus claims, the entire descriptive part and the figures.

The motor vehicle 3 may be a conventional motor vehicle 3 having an internal combustion engine as the sole drive source. However, the motor vehicle 3 may also be an electrically driven motor vehicle 3 (purely by electrical battery, by a fuel cell, or a combination of these), a motor vehicle 3 that can also be driven by electrical battery (serial hybrid motor vehicle 3, plug-in hybrid vehicle 3), etc.

Figure 3:
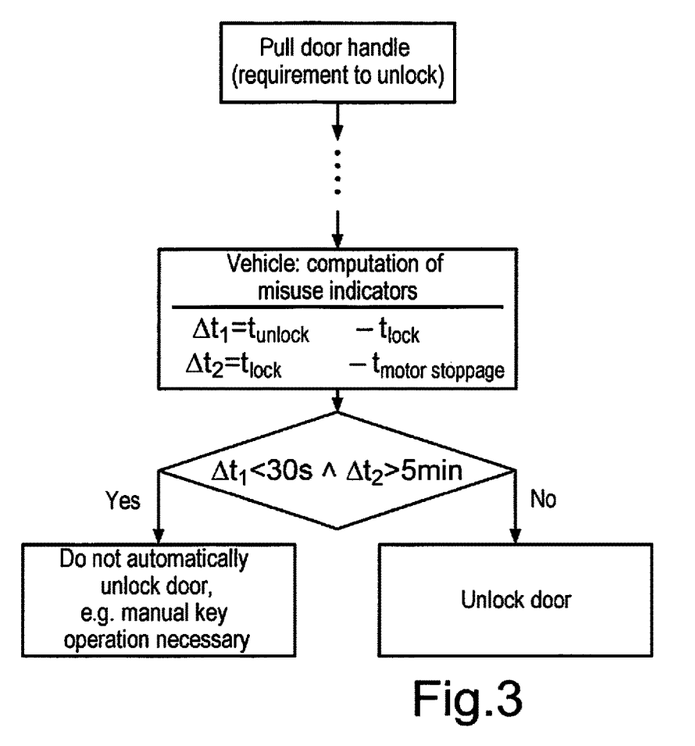
FIG. 3 shows a detail from a disclosed method.

FIG. 3 depicts a detail from an example of a disclosed method. In the example depicted in FIG. 3, the computation of the probability of misuse is restricted to a check on the magnitude of two misuse indicators (in this case: time periods).

After the door handle is pulled (unlock request), the control device 4 of the system 1 transmits a "wake signal". Subsequently, an electronic key 7 within range of the radio signal uses the mechanism for sending/receiving signals 8 that are provided for it to transmit, inter alia, an encoded signal for its authentication, and a check on the encoded signal is effected by the control device 4 (these operations are not depicted in FIG. 3 for the sake of clarity). In the case of a corresponding automatic locking and starting system based on the prior art, a positive result from the check readily prompted the production of a control signal at least for unlocking the vehicle doors 5.

As a departure from this, as depicted in FIG. 3, computation of a probability of misuse is effected on the basis of (in the example depicted) two derived time differences that can be used as misuse indicators, namely the time difference $\Delta t1$ between the vehicle doors 5 being unlocked and locked and the time difference $\Delta t2$ between the vehicle doors 5 being locked and the motor 9 stopping.

For both time differences, a respective condition is defined (in this case: $\Delta t1$ less than 30 seconds and $\Delta t2$ greater than 5 minutes).

If both constraints are fulfilled, it is assumed in the example shown that a probability of misuse is so high that automatic unlocking of the vehicle doors 5 is not effected and unlocking of the vehicle doors 5 requires a further authentication criterion, in the example depicted manual operation of a button on the electronic key 7.

The disclosed method may have provision for a preliminary method to involve a neural network being trained using a training data record and subsequently verified on the basis of test data. A further example for the system 1 to be preconditioned in a suitable manner by the manufacturer is the application of big data analyses. Accordingly, generated data records can then be stored, or may have been stored, in the system 1 according to the present disclosure.

Since vehicles 3 can have totally different use profiles on account of the different requirements and behaviors of their users 2, however, it is beneficial if the system 1 (and also the method according to the present disclosure) has provision for a learning mode that, when activated, allows data regarding proper use of the vehicle 3 to be captured and/or to be input by a legitimate user 2 of the vehicle 3.

It is possible, without special limitations, for all configurations of such a learning mode that appear useful and necessary to be provided, for example, capture of data to be performed at prescribable intervals of time, quasi-continuous or continuous capture of data during proper use of the vehicle 3, so as to be able to capture new data, to verify previously captured data or to identify a changed user behavior. It is also possible to capture the manners in which different authorized users 2 (for example, different family members) effect use (it being possible to use corresponding identification methods for the different users 2, for example, using information stored in their respective electronic key 7, using face recognition in the vehicle interior, using an operating action for an operating device provided for this purpose, etc.).

When data are input into the system 1 in a learning mode by a user 2, the user can input his typical starting times for recurring journeys, for example, and how long thereafter the vehicle 3 regularly remains in the locked mode. There may also be provision for the learning mode to be configured such that uses captured during the learning mode are subsequently denoted by a user 2 as "typical" uses, i.e., uses representing his average user behavior, and as "atypical" uses, i.e., uses that occur rather rarely.

For the computation of a probability of misuse or for the stipulation of the magnitude of the threshold value/s, it is also possible, according to the present disclosure, for a smartphone or smart watch App to be taken into consideration or used, which allows a user 2 to send a report to the vehicle 3 as soon as he is moving in the direction of the vehicle 3 (the carpark that the vehicle 3 is in). If this increases the threshold value for identification of misuse, then although a less sensitive system 1 (and method) is obtained, the probability of a misdetection is reduced.

LIST OF REFERENCE SYMBOLS

1 System
2 User
3 Vehicle
4 Control device
5 Vehicle door
6 Motor control device
7 Electronic key
8, 8' Mechanism for sending and receiving signals
9 Motor
10 Signaling device

The invention claimed is:

1. A system for automatic control of entry and/or motor starting authorization of a user for a motor vehicle, the system comprising:
a control device that controls at least one function of unlocking/locking one or more entry doors of the motor vehicle and/or enabling/disabling a motor control device adapted for controlling operation of a motor of the motor vehicle; and
an electronic key associated with the control device,
wherein the control device and the electronic key each include a transceiver for sending and receiving signals,
wherein at least one signal transmitted from the electronic key to the control device is an encoded signal for authentication of the electronic key so that, after evaluation of the encoded signal, given an authorized electronic key, the control device produces a control signal for unlocking one or more of the entry doors and/or for enabling of the motor control device,
wherein the control device is configured for at least one of:
computing, after receiving the encoded signal for an authorized electronic key, by at least one statistical computation method using one or more pieces of information available to the control device able to be used as an indication for computation of a probability of misuse of the electronic key for obtaining an entry and/or motor starting authorization for the motor vehicle, and, in response to the computed probability of misuse reaching or exceeding a prescribable threshold value, stopping at least one control signal for unlocking one or more of the entry doors and/or for enabling of the motor control device or producing the at least one control signal only in response to at least one additional authentication criterion being satisfied, wherein the one or more pieces of information include at least one of:
a time of a last stoppage of the motor of the motor vehicle;
a time of a last start of the motor of the motor vehicle;
a time of a last locking of the one or more entry doors;
a time of a last unlocking of the one or more entry doors;
a time of a last disabling of the motor control device;
a time of a last enabling of the motor control device;
which of the one or more entry doors that was used last;
an approximate position of the electronic key in an interior of the motor vehicle before a last start of the motor of the motor vehicle;
times of regularly made journeys; and
regular times of nonuse of the motor vehicle; and
deactivating the system for control of the entry and/or motor starting authorization in response to the control device using at least one statistical computation method to establish that the motor vehicle is parking in an environment in which the probability of future misuse of the electronic key reaches or exceeds a prescribable threshold value based on current parking coordinates of the motor vehicle and at least one further criterion associable with the parking coordinates.

2. The system of claim 1, wherein the one or more pieces of information include at least one of:
a time difference between a last unlocking and a last locking of the one or more entry doors;
a time difference between a last stoppage of the motor of the motor vehicle and a last locking of the one or more entry doors; and
a time difference between a last unlocking of the one or more entry doors and a last start of the motor of the motor vehicle.

3. The system of claim 1, wherein the additional authentication criterion includes at least one of:
manual operation of the electronic key;
presence of a trustworthy mobile device within a maximum, prescribable distance from the motor vehicle;
presence of a mobile device on hand for a last locking of the one or more entry doors within a maximum, prescribable distance from the motor vehicle;
confirmation action by a user for a trustworthy mobile device;
authentication by voice recognition; and
authentication by performance of a prescribable gesture.

4. The system of claim 1, wherein the further criterion associable with the parking coordinates includes at least one of:
whether the parking position is in a public carpark;
whether the parking position is in a railroad station or surroundings of a railroad station;
whether the parking position is in a surroundings of a freeway entry ramp;
whether the parking position is in a rest area on a freeway;
whether the parking position is in an environment with an increased number of criminal offences in comparison with the average;
whether the parking position is in a private carpark;
whether the parking position is adjacent a residence;
whether the parking position is adjacent a workplace.

5. The system of claim 1, further comprising a signaling device that signals to the user a denial of unlocking of the one or more entry doors, a denial of enabling of the motor control device, a requirement for an additional authentication criterion and/or a deactivation of the system for control of the entry and/or motor starting authorization.

6. The system of claim 1, wherein the at least one statistical computation method makes use of or is based on:
a neural network;
a rule-based method;
a tree-based algorithm;
a genetic algorithm;
fuzzy logic;
a hybrid model;
a Bayesian network; or
meta learning.

7. The system of claim 1, further comprising a learning mode that, when activated, allows data regarding proper use of the motor vehicle to be captured and/or input into the system by a legitimate user of the vehicle.

8. A motor vehicle including the system for automatic control of entry and/or motor starting authorization of a user for the motor vehicle as recited in claim 1.

9. A method for control of a system for automatic entry and/or motor starting authorization of a user for a motor vehicle, wherein the system comprises a control device that controls at least one function of unlocking/locking one or more entry doors of the motor vehicle and/or enabling/disabling the motor control device, and an electronic key associated with the control device, wherein the control device and the electronic key have a transceiver for sending and receiving signals, the method comprising:
 transmitting at least one encoded signal from the electronic key to the control device; for authentication of the electronic key;
 evaluating the encoded signal for an authorized electronic key;
 producing a control signal with the control device, given an authorized electronic key, for unlocking one or more of the entry doors and/or for enabling of the motor control device; and
 the method further comprising at least one of:
 computing, after receiving the encoded signal for an authorized electronic key, by at least one statistical computation method using one or more pieces of information available to the control device able to be used as an indication for computation of a probability of misuse of the electronic key or obtaining an entry and/or motor starting authorization for the motor vehicle, and, in response to the computed probability of misuse reaching or exceeding a prescribable threshold value, stopping at least one control signal for unlocking one or more of the entry doors and/or for enabling of the motor control device or producing the at least one control signal only in response to at least one additional authentication criterion being satisfied, wherein the one or more pieces of information include at least one of:
  a time of a last stoppage of the motor of the motor vehicle;
  a time of a last start of the motor of the motor vehicle;
  a time of a last locking of the one or more entry doors;
  a time of a last unlocking of the one or more entry doors;
  a time of a last disabling of the motor control device;
  a time of a last enabling of the motor control device;
  which of the one or more entry doors that was used last;
  an approximate position of the electronic key in an interior of the motor vehicle before a last start of the motor of the motor vehicle;
  times of regularly made journeys; and
  regular times of nonuse of the motor vehicle; and
 deactivating the system for control of the entry and/or motor starting authorization in response to the control device using at least one statistical computation method to establish that the motor vehicle is parking in an environment in which the probability of future misuse of the electronic key reaches or exceeds a prescribable threshold value based on current parking coordinates of the motor vehicle and at least one further criterion associable with the parking coordinates.

10. The method of claim 9, wherein the one or more pieces of information include at least one of:
 a time difference between a last unlocking and a last locking of the one or more entry doors;
 a time difference between a last stoppage of the motor of the motor vehicle and a last locking of the one or more entry doors; and
 a time difference between a last unlocking of the one or more entry doors and a last start of the motor of the motor vehicle.

11. The method of claim 9, wherein the additional authentication criterion includes at least one of:
 manual operation of the electronic key;
 presence of a trustworthy mobile device within a maximum, prescribable distance from the motor vehicle;
 presence of a mobile device on hand for a last locking of the one or more entry doors within a maximum, prescribable distance from the motor vehicle;
 confirmation action by a user for a trustworthy mobile device;
 authentication by voice recognition; and
 authentication by performance of a prescribable gesture.

12. The method of claim 9, wherein the further criterion associable with the parking coordinates includes at least one of:
 whether the parking position is in a public carpark;
 whether the parking position is in a railroad station or surroundings of a railroad station;
 whether the parking position is in a surroundings of a freeway entry ramp;
 whether the parking position is in a rest area on a freeway;
 whether the parking position is in an environment with an increased number of criminal offences in comparison with the average;
 whether the parking position is in a private carpark;
 whether the parking position is adjacent a residence;
 whether the parking position is adjacent a workplace.

13. The method of claim 9, wherein the system further comprises a signaling device that signals to the user a denial of unlocking of the one or more entry doors, a denial of enabling of the motor control device, a requirement for an additional authentication criterion and/or a deactivation of the system for control of the entry and/or motor starting authorization.

14. The method of claim 9, wherein the at least one statistical computation method makes use of or is based on:
 a neural network;
 a rule-based method;
 a tree-based algorithm;
 a genetic algorithm;
 fuzzy logic;
 a hybrid model;
 a Bayesian network; or
 meta learning.

15. The method of claim 9, wherein the system further comprises a learning mode that, when activated, allows data regarding proper use of the motor vehicle to be captured and/or input into the system by a legitimate user of the vehicle.

16. A control device for control of at least one function of unlocking/locking one or more entry doors of a motor vehicle and/or enabling/disabling a motor control device of the motor vehicle, wherein the control device is configured for:
 receiving at least one encoded signal from an electronic key associated with the control device for authentication of the electronic key; and
 evaluating the encoded signal, and given that the electronic key is an authorized electronic key, produce a control signal for unlocking one or more of the entry doors and/or for enabling of the motor control device,
 wherein the control device is further configured for:
 computing, after receiving the encoded signal for an authorized electronic key, by at least one statistical computation method using one or more pieces of information available to the control device able to be used as an indication for computation of a probability of misuse of the electronic key for obtaining an entry and/or motor starting authorization for the motor vehicle, and in response to the computed probability of misuse reaching or exceeding a prescribable threshold value, stopping at least one control signal for unlocking one or more of the entry doors and/or for enabling of the motor control device or producing the at least one control signal only in response to at least one additional authentication criterion being satisfied, wherein the one or more pieces of information include at least one of:

a time of a last stoppage of the motor of the motor vehicle;
a time of a last start of the motor of the motor vehicle;
a time of a last locking of the one or more entry doors;
a time of a last unlocking of the one or more entry doors;
a time of a last disabling of the motor control device;
a time of a last enabling of the motor control device;
which of the one or more entry doors that was used last;
an approximate position of the electronic key in an interior of the motor vehicle before a last start of the motor of the motor vehicle;
times of regularly made journeys; and
regular times of nonuse of the motor vehicle; and
deactivating control of the entry and/or motor starting authorization in response to the control device using at least one statistical computation method to establish if the motor vehicle is parking in an environment in which the probability of future misuse of the electronic key reaches or exceeds a prescribable threshold value based on current parking coordinates of the motor vehicle and at least one further criterion associable with the parking coordinates.

17. The control device of claim 16, wherein the one or more pieces of information include at least one of:
a time difference between a last unlocking and a last locking of the one or more entry doors;
a time difference between a last stoppage of the motor of the motor vehicle and a last locking of the one or more entry doors; and
a time difference between a last unlocking of the one or more entry doors and a last start of the motor of the motor vehicle.

18. The control device of claim 16, wherein the additional authentication criterion includes at least one of:
manual operation of the electronic key;
presence of a trustworthy mobile device within a maximum, prescribable distance from the motor vehicle;
presence of a mobile device on hand for a last locking of the one or more entry doors within a maximum, prescribable distance from the motor vehicle;
confirmation action by a user for a trustworthy mobile device;
authentication by voice recognition; and
authentication by performance of a prescribable gesture.

19. The control device of claim 16, wherein the further criterion associable with the parking coordinates includes at least one of:
whether the parking position is in a public carpark;
whether the parking position is in a railroad station or surroundings of a railroad station;
whether the parking position is in a surroundings of a freeway entry ramp;
whether the parking position is in a rest area on a freeway;
whether the parking position is in an environment with an increased number of criminal offences in comparison with the average;
whether the parking position is in a private carpark;
whether the parking position is adjacent a residence;
whether the parking position is adjacent a workplace.

20. The control device of claim 16, further comprising a learning mode that, when activated, allows data regarding proper use of the motor vehicle to be captured and/or input into the control device by a legitimate user of the vehicle.

* * * * *